United States Patent [19]
Salam

[11] Patent Number: 4,961,005
[45] Date of Patent: Oct. 2, 1990

[54] PROGRAMMABLE NEURAL CIRCUIT IMPLEMENTABLE IN CMOS VERY LARGE SCALE INTEGRATION

[75] Inventor: Fathi M. A. Salam, Okemos, Mich.

[73] Assignee: Board of Trustees operating Michigan State University, East Lansing, Mich.

[21] Appl. No.: 343,080

[22] Filed: Apr. 25, 1989

[51] Int. Cl.$^5$ .................. G06G 7/12; H03K 3/027; H03K 19/20; G11C 27/02
[52] U.S. Cl. ......................... 307/201; 307/585; 307/272.3; 365/163
[58] Field of Search ............... 307/201, 202.1, 585, 307/272.3; 365/163; 128/419 PG, 86, 420.6, 421, 733, 741; 357/4, 6, 20; 364/424.01, 413.01; 381/172, 23.1, 68.2, 68.4

[56] References Cited

U.S. PATENT DOCUMENTS

| | | | |
|---|---|---|---|
| 3,394,351 | 6/1965 | Martin | 307/201 |
| 4,660,166 | 4/1987 | Hopfield | 307/201 X |
| 4,782,460 | 11/1988 | Spencer | 307/201 X |
| 4,807,168 | 2/1989 | Moopenn et al. | 307/201 X |
| 4,866,645 | 9/1989 | Lish | 307/201 X |
| 4,874,963 | 10/1989 | Alspector | 307/201 |
| 4,875,183 | 10/1989 | Graf et al. | 307/201 X |
| 4,903,226 | 2/1990 | Tsividis | 307/201 X |
| 4,906,865 | 3/1990 | Holler | 307/201 X |
| 4,908,525 | 3/1990 | Yung | 307/202.1 |

OTHER PUBLICATIONS

J. J. Hopfield et al., IEEE Transactions on Circuits and Systems, vol. CAS-33. No. 5, (1986), pp. 533-541.

Primary Examiner—Stanley D. Miller
Assistant Examiner—David R. Bertelson
Attorney, Agent, or Firm—Ian C. McLeod

[57] ABSTRACT

The present invention is a neural network circuit including a plurality of neuron circuits. Each neuron circuit has an input node for receiving an input signal, an output node for generating an output signal and a self-feedback control node for receiving a self-feedback signal. An interconnection device having an electrically controllable conductance is connected between the input nodes of each pair of neuron circuits. The neural network circuit is consequently programmable via the voltages applied to the self-feedback control nodes and the interconnection devices. Such programmability permits the neural network circuit to store certain sets of desirable steady states. In the preferred embodiment the individual neuron circuits and the interconnection devices are constructed in very large scale integration CMOS. Thus this neural network circuit can be easily constructed with large numbers of neurons.

12 Claims, 1 Drawing Sheet

PROGRAMMABLE NEURAL CIRCUIT IMPLEMENTABLE IN CMOS VERY LARGE SCALE INTEGRATION

TECHNICAL FIELD OF THE INVENTION

The technical field of the invention is the field of neural networks and particularly feedback neural networks analogous to the Hopfield type.

BACKGROUND OF THE INVENTION

Neural networks represent an alternative approach to information processing than the serial algorithmic computers of the type envisioned by John von Neumann. In a computer of the von Neumann type a single processing device executes an explicit program in a step-by-step serial fashion. Many information processing problems can be solved by this approach, as witnessed by the recent explosive rise in the number of computers and in the number of applications susceptible to computer processing.

There are limitations to type of information processing which can be performed by a computer based on the von Neumann model. Before such a computer can be employed to perform an information processing function, a person must understand the nature of the problem to be solved and produce an explicit program of instructions to solve this problem according to an algorithm. An algorithm is a mechanistic or recursive procedure for the solution of a problem. The existence of such an algorithm is a necessary condition for information processing employing a computer based on the von Neumann model. In addition, it is further necessary that a person translate that algorithm into the explicit program required by the particular computer.

There are numerous important information processing tasks which are difficult or impossible to perform using von Neumann type computers. In some cases algorithms have not yet been developed for these information processing tasks. In other cases it may be impossible to develop an algorithm of the type required by von Neumann type computers. Information processing tasks of this type include understanding continuous speech, identifying handwritten characters, and identifying objects having varying orientations.

Problems of this type are of the sort that people can do well while current computers do poorly or not at all. Neural networks are attempts to exploit the supposed organization of the human brain to attack these problems. Neural networks are collections of many individual computing elements called neurons. These neurons are coupled together in complex networks in which any single neuron receives input from many other neurons. The coupling from any neuron to another neuron many be strong or weak.

There are two methods commonly employed in selection of these internal representation of the network. In the most general of neural networks a feedback learning process is employed to change the strength of connection between neurons and to change the transfer function of each neuron to accommodate the particular information processing task at hand. Usually this is done by presenting inputs to the neural network and the corresponding desired outputs, and allowing the network determine the proper internal representation for generating the desired output from the input. An important class of neural networks, including those constructed according to the Hopfield model, do not yet incorporate this dynamic learning process but require preset connection strengths. This permits the construction of large networks by simplifying the construction of individual neurons and their connections. However, this advantage in construction is offset by the requirement that the connection strengths corresponding to a set of desired stored vectors be known.

Typical neuron networks include many individual neurons. Practical uses of neural networks often require hundreds or thousands of neurons. If information processing using neural networks is to achieve wide use, the construction of neural networks must be adapted to permit large number of neurons to be employed. This implies an accommodation between the model of individual neurons and their connectivity and circuits that are readily and abundantly realizable in hardware. Due to the large size of such neural networks, it would be particularly advantageous to construct neural networks in an integrated circuit technology which is relatively inexpensive, such as complementary metal oxide semiconductor very large scale integration (CMOS VLSI).

Hopfield has proposed a neural circuit model in, e.g. "Simple Neural Optimization Networks: an A/D converter, a signal decision circuit, and a linear programming circuit", by J.J. Hopfield and D.W. Tank, *IEEE Transactions on Circuits and Systems*, vol. CAS-33, No. 5, May 1986, pages 533–541. There are some obstacles in VLSI implementation of this neuron circuit including: 1) the necessary dense connectivity between neurons; 2) the requirement that the linear resistive element from output j to input i ($T_{ji}$) be equal to the linear resistive element from output i to input j ($T_{ij}$); and 3) the problem of implementing variable linear resistive elements in silicon. The first problem is not different from existing challenges in VLSI designs and can be dealt with using standard and evolving techniques. It is known that the equality of the complementary linear resistive elements is a necessary condition to ensure convergence of all solutions to equilibria only. It is also known that small imperfections generally preserve the convergence to equilibria but may introduce spurious non-equilibria steady states. Thus this requirement is a problem that may be possible to endure. The last obstacle, that of implementing variable linear resistance elements in silicon, appears to be the major obstacle to constructing the existing continuous-time models of artificial neural networks in analog VLSI; in particular, dynamic feedback neural networks of the Hopfield type.

SUMMARY OF THE INVENTION

The present invention is a neural network circuit including a plurality of neuron circuits. Each neuron circuit has an input node for receiving and storing thereon an input signal, an output node for generating an output signal and a self-feedback control node for receiving a self-feedback signal. The output signal of the neuron circuit is a function of the input signal and the self-feedback signal. The neuron circuits are connected via a plurality of interconnection devices, one interconnection device connected between the input nodes of each pair of neuron circuits. Each interconnection device has an electrically controllable nonlinear conductance.

In the preferred embodiment the individual neuron circuits are constructed as follows. A capacitor and a resistor are connected in parallel between the input node and ground. The input node is also connected to the input terminal of an amplifier circuit, which may be constructed of two field effect transistor inverter circuits coupled in tandem. The neuron circuit self-feedback is controlled by a field effect transistor having a source-drain path connected between the input terminal and the output terminal of the amplifier circuit, and a gate connected to the self-feedback control node. The field effect transistor provides variable nonlinear conductance feedback between the output terminal and the input terminal corresponding to the self-feedback signal.

In the preferred embodiment each of the interconnection devices is a field effect transistor. Each such field effect transistor has a source-drain path connected between the input nodes of the pair of the neuron circuits. The voltage at the gate thus controls the interconnection strength between the input nodes.

When constructed in this manner, the neural network can be embodied in very large scale integration CMOS. In particular the capacitor and resistor at the input node of each neuron circuit could be eliminated and their roles achieved by the parasitic capacitance and resistance to ground at that node. Thus this neural network circuit can be easily constructed in all MOS with large numbers of neurons.

BRIEF DESCRIPTION OF THE DRAWINGS

These and other objects and aspects of the present invention will become clear from the following description of the invention taken in conjunction with the Figures, in which.

DETAILED DESCRIPTION OF THE PREFERRED EMBODIMENT

Figure 1:
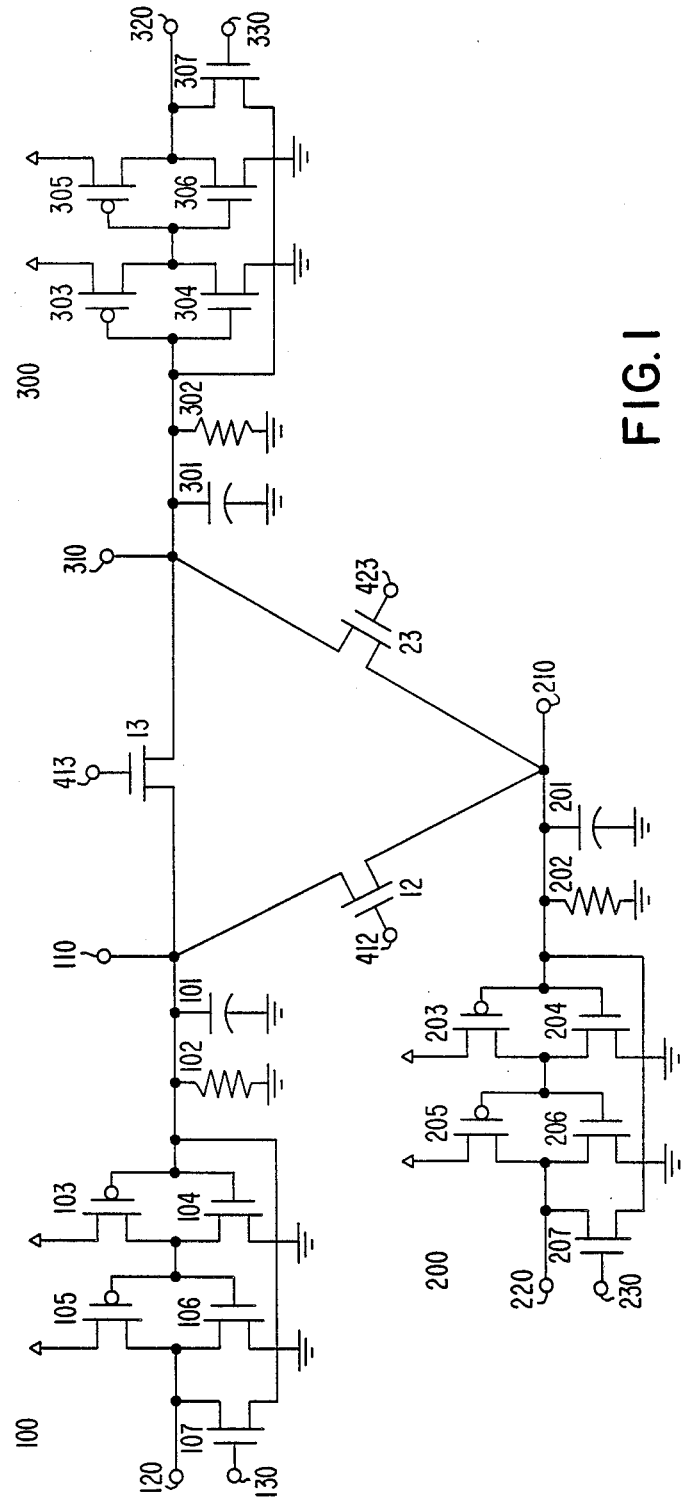
FIG. 1 illustrates the circuit of a neural network in accordance with the present invention for the case of three neuron circuits.

The present invention includes a neuron circuit and a unique interconnection technique. FIG. 1 illustrates three neuron circuits 100, 200 and 300 connected together in accordance with the teachings of the present invention.

Each neuron includes the identical circuit. For brevity only neuron circuit 100 will be described in detail. Neuron circuit 100 includes an input terminal 110, and output terminal 120 and a self-feedback control terminal 130. Capacitor 101 and resistor 102 are coupled between input terminal 110 and ground. In a practical circuit constructed in CMOS VLSI, both capacitor 101 and resistor 102 can be realized by parasitic characteristics of the input terminal. Thus capacitor 101 is the parasitic capacitance of this node and resistor 102 is the parasitic resistance to ground of this node.

Input terminal 110 is connected to an amplifier. In the illustrated embodiment this amplifier consists of two CMOS inverters in tandem. The first inverter includes field effect transistors 103 and 104. The voltage on input terminal 110 controls the conductivity of field effect transistors 103 and 104 thereby producing an inverted signal on the gates of field effect transistors 105 and 106. The second inverter includes field effect transistors 105 and 106 and is identical to the first inverter. The output of the second inverter appears at the output terminal 120. Other amplifier circuits are feasible, the illustrated tandem inverter circuit being merely a convenient design choice.

Self-feedback field effect transistor 107 has its source-drain path connected between input terminal 110 and output terminal 120. The substrate of self-feedback field effect transistor 107 is grounded. This causes the source and drain to become interchangable. Thus the source-drain path of self-feedback field effect transistor 107 appears the same at the input terminal 110 and the output terminal 120. The voltage applied to the gate of self-feedback field effect transistor 107 (which is also the self-feedback control terminal 130) controls the amount of feedback between the output terminal 120 and the input terminal 110 of the neuron circuit.

The network of neuron circuits is formed as follows. A field effect transistor is connected between the input terminals of each neuron circuit. FIG. 1 illustrates the simple case of 3 neuron circuits. Field effect transistor 12 is coupled between input terminal 110 and input terminal 210. The voltage at gate 412 controls the conductivity of field effect transistor 12, and hence the coupling between input terminal 110 and input terminal 210. Field effect transistor 13 is coupled between input terminal 110 and input terminal 310, with the voltage at gate 413 controlling the coupling between input terminal 110 and input terminal 310. Field effect transistor 23 is coupled between input terminal 210 and input terminal 310, with the voltage at gate 423 controlling the coupling between input terminal 210 and input terminal 310. Note that FIG. 1 illustrates that each of these field effect transistors 12, 13 and 23 have grounded substrates. This insures that the source and drain are interchangeable.

In the present invention there is a field effect transistor coupling the input terminal of each pair of neuron circuits. The total number of connections (other than input and output connections) for this network is $n(n+1)/2$, where n is the number of neurons. Note that the number of field effect transistors needed to couple every input terminal to every other input terminal is $n(n-1)/2$. The number of self-feedback field effect transistors is n. The sum of these quantities is $n(n+1)/2$, the number of connections needed for this network.

This is in contrast to the number of connections needed in the Hopfield type feedback neural network. The number of connections between neurons in a Hopfield type feedback neural network is $n(n-1)$. The number of self-feedback connections, if utilized, is n. The sum total of these connections is thus $n^2$. Therefore, this invention results in reducing the number of internal connections by about $n^2 - (n(n+1)/2)$ or $n(n-1)/2$.

The network is utilized as follows. The amount of self-feedback for each of the neuron circuits is set by control of the voltage at the respective self-feedback control terminals 130, 230 and 330. The relative connectivity between pairs of neuron circuits is set by control of the voltages at respective gates 412, 413 and 423. Then voltage at each of the input terminals 110, 210 and 310 is initialized by an external input circuit. The input voltages applied to input terminals 110, 210 and 310 are then disconnected. The output terminals 120, 220 and 320 of the network circuit observed until an equilibrium steady-state is reached. This steady state condition is the result of the information processing of the neural network. Note that connections between the input terminals 110, 210, and 310 cause charge to be shared between the capacitors 101, 201 and 301 to a degree determined by the voltages at gates 412, 413 and 423. In general currents will flow through field effect transistors 12, 13 and 23, these currents coming from the self-feedback field effect transistors 107, 207 and 307.

It can be shown that the neural network circuit of the present invention is globally convergent to equilibrium points only. Let the current function $I_{ds}$ of each field effect transistor denote the positive current flowing from the drain to source. Field effect transistors are known to operate in three domains: cutoff; triode; and saturation. The domain depends upon the relationship between the source voltage $v_s$, the gate voltage $v_g$, the drain voltage $v_d$ and the threshold voltage $v_t$.

Cutoff: If $(v_g - v_s - v_t) \leq 0$, then $I_{ds}(v_d, v_s, v_g) = 0$

Triode: If $(v_g - v_s - v_t) \geq (v_d - v_s)$, then $I_{ds}(v_d, v_s, v_g) = \frac{1}{2}\mu C_{ox}(W/L)[2(v_g - v_s - v_t)(v_d - v_s) - (v_d - v_s)^2]$ Saturation: If $(v_g - v_s - v_t) \leq (v_d - v_s)$, then $I_{ds}(v_d, v_s, v_g) = \frac{1}{2}\mu C_{ox}(W/L)[v_g - v_s - v_t]^2$ where W/L is the ratio of the gate width W to the gate length L, $C_{ox}$ is the oxide capacitance per unit area and $\mu$ is the mobility of carriers. If the substrate voltage $v_{subs}$ is connected to ground instead of to the source node of the MOSFET, then the roles of the source and drain are interchangable. Hence the characteristic function $I_{ds}$ is an odd function of $v_d - v_s$ ranging over real time.

If we apply Kirchoff's current law to each input terminal we obtain:

$$C_i \frac{du_i}{dt} = \sum_{j \neq i}^{n} I_{ij}(u_j, u_i, V_{gij}) + I_i(v_i, u_i, V_{gi}) - \frac{u_i}{R_i}$$

$$v_i = S_i(u_i)$$

where $C_i$ is the capacitance at the input terminal of the i-th neuron circuit, $u_i$ is the voltage at the i-th input terminal, $I_{ij}$ is the above current function $I_{ds}(v_d, v_s, v_g)$ for the field effect transistor connecting the input terminals of the i-th and the j-th input terminals, $u_j$ s the voltage at the j-th input terminal, $V_{gij}$ is the gate voltage for the field effect transistor connecting the input terminals of the i-th and the j-th input terminals, $I_i$ is the above current function $I_{ds}(v_d, v_s, v_g)$ for the self-feedback field effect transistor for the i-th neuron circuit, $v_i$ is the voltage at the output terminal of the i-th neuron circuit, $V_{gi}$ is the gate voltage for the self-feedback field effect transistor of the i-th neuron circuit, $R_i$ is the resistance at the input terminal of the i-th neuron, and $S_i$ is the transfer function of the i-th neuron circuit. Thus the charge stored in the capacitor, e.g. 101, for a particular input terminal equals the net inflows from the other input terminals via the plural connection field effect transistors plus the net inflow from the self-feedback field effect transistor of that neuron circuit minus the current drain through the resistor, e.g. 102, at that input terminal. It can be shown that this mathematical model is globally convergent to equilibrium points only. Thus this circuit possesses the properties of a useful neural network circuit.

I claim:

1. A neural network circuit comprising:
    a plurality of neuron circuits, each neuron circuit having an input node for receiving an input signal, an output node for generating an output signal and a self-feedback control node for receiving a self-feedback signal, said output signal of each neuron circuit being a function of said input signal and said self-feedback signal; and
    a plurality of interconnection devices, one interconnection device connected between said input nodes of each pair of neuron circuits, each interconnection device having an electrically controllable nonlinear conductance.

2. The neural network circuit claimed in claim 1, wherein:
    each of said interconnection devices consists of a field effect transistor having a drain connected to the input node of a first of said neuron circuits, a source connected to the input node of a second of said neuron circuits, a gate and a substrate connected to a reference voltage, said nonlinear conductance being electrically controllable via the voltage on said gate.

3. The neural network circuit claimed in claim 1, wherein:
    each of said plurality of neuron circuits includes
    a capacitor connected between said input node and said reference voltage,
    a resistor connected between said input node and said reference voltage,
    an amplifier circuit having an input terminal connected to said input node and an output terminal connected to said output node, said amplifier generating an output signal on said output terminal which is a function of the signal on said input terminal, and
    a field effect feedback device having a source-drain path connected between the input terminal of said amplifier circuit and the output terminal of said amplifier circuit, a gate connected to said self-feedback control node, and a substrate connected to said reference voltage, said field effect feedback device for providing variable conductance feedback between said output terminal and said input terminal corresponding to said self-feedback signal.

4. The neural network circuit claimed in claim 3, wherein:
    said amplifier circuit of each of said plurality of neuron circuits consists of two field effect transistor inverter circuits disposed in tandem.

5. The neural network circuit claimed in claim 3, wherein:
    said neural network circuit is constructed in complementary metal oxide semiconductor integrated circuits.

6. The neural network circuit claimed in claim 5, wherein:
    said capacitor of each of said neuron circuits consists of the parasitic capacitance of the corresponding input node.

7. The neural network circuit claimed in claim 5, wherein:
    said resistor of each of said neuron circuits consists of the parasitic resistance to ground of the corresponding input node.

8. A neural network circuit comprising:
    a plurality of neuron circuits, each neuron circuit including
    an input node for receiving an input signal,
    an output node,
    a self-feedback control node for receiving a self-feedback signal,
    a capacitor connected between said input node and a reference voltage,
    a resistor connected between said input node and said reference voltage,
    an amplifier circuit having an input terminal connected to said input node and an output terminal connected to said output node, said amplifier generating an output signal on said output terminal which is a function of said input signal on said input terminal, a field effect feedback device having a source-drain path connected between the input terminal of said amplifier circuit and the output terminal of said amplifier circuit, a gate connected to said self-feedback control node, and a substrate connected to said reference voltage, said field effect feedback device for providing variable conductance feedback between said output terminal and said input terminal corresponding to said self-feedback signal; and a plurality of interconnection field effect transistors, one interconnection field effect transistor connected between said input nodes of each pair of neuron circuits, each interconnection field effect transistor having a drain connected to the input node of a first of said neuron circuits, a source connected to the input node of a second of said neuron circuits, a gate and a substrate connected to said reference voltage.

9. The neural network circuit claimed in claim 8, wherein:

said amplifier circuit of each of said plurality of neuron circuits consists of two field effect transistor inverter circuits disposed in tandem.

10. The neural network circuit claimed in claim 8, wherein:

said neural network circuit is constructed in complementary metal oxide semiconductor integrated circuits.

11. The neural network circuit claimed in claim 10, wherein:

said capacitor of each of said neuron circuits consists of the parasitic capacitance of the corresponding input node.

12. The neural network circuit claimed in claim 10, wherein:

said resistor of each of said neuron circuits consists of the parasitic resistance to ground of the corresponding input node.

* * * * *

UNITED STATES PATENT AND TRADEMARK OFFICE
CERTIFICATE OF CORRECTION

PATENT NO. : 4,961,005

DATED : October 2, 1990

INVENTOR(S) : Fathi M. A. Salam

It is certified that error appears in the above-identified patent and that said Letters Patent is hereby corrected as shown below:

Column 1, line 65, after "work", --to-- should be inserted.

Column 5, lines 12, and 15, "$\leqq$" should be --$\leq$--.

Column 5, line 13, "$\geqq$" should be --$\leq$--.

Column 5, line 36, "s" should be --is--.

Signed and Sealed this

Ninth Day of June, 1992

*Attest:*

DOUGLAS B. COMER

*Attesting Officer*     *Acting Commissioner of Patents and Trademarks*